Jan. 1, 1935.  A. C. W. SAUNDERS  1,986,414
DEVICE FOR TESTING ELECTRIC CIRCUITS
Filed March 9, 1931
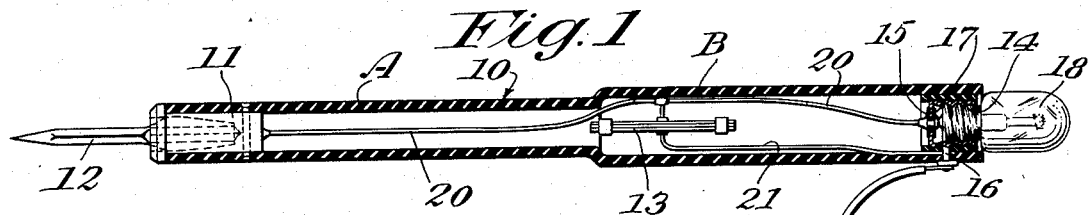
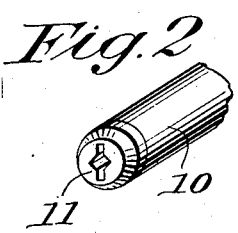
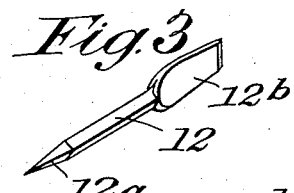
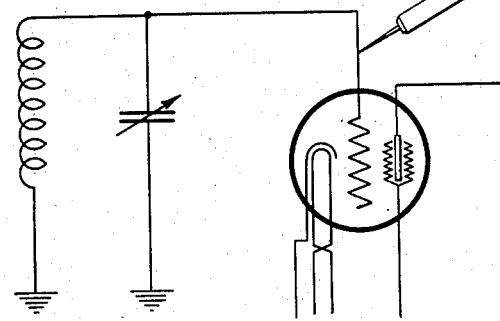
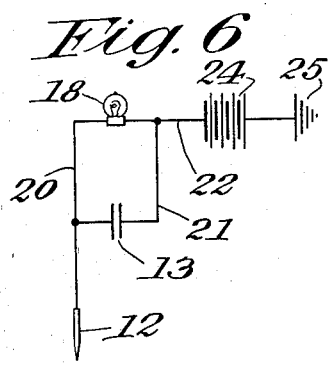
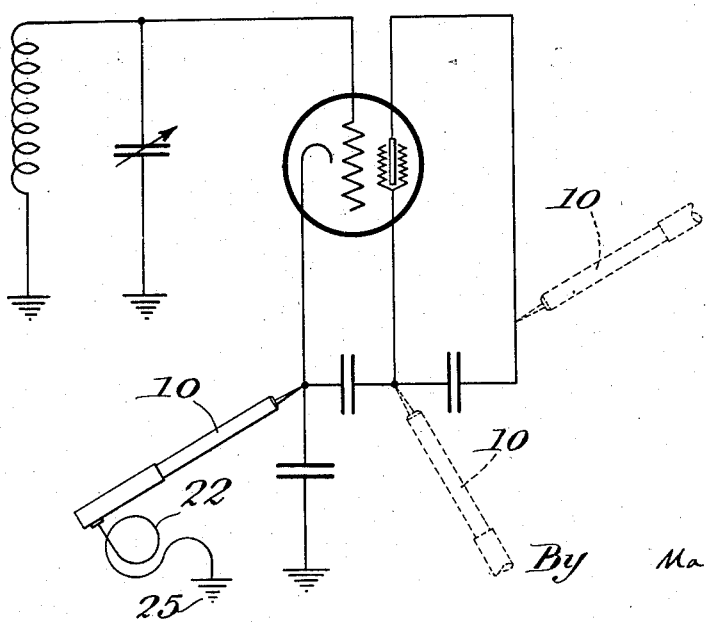
*Inventor:*
Albert C. W. Saunders
*By* Macleod, Calver, Copeland + Dike
*Attorneys.*

Patented Jan. 1, 1935

1,986,414

UNITED STATES PATENT OFFICE 1,986,414

DEVICE FOR TESTING ELECTRIC CIRCUITS

Albert C. W. Saunders, Medford, Mass.

Application March 9, 1931, Serial No. 521,102

2 Claims. (Cl. 175—183)

This invention relates to a device for testing electric circuits. It is particularly adapted for use in testing and assembling radio receiving sets and while the invention is not limited to such use, for the purpose of a full disclosure and description of my invention I have described it in connection with a radio receiving circuit.

When trouble occurs in a radio receiving set it is exceedingly difficult even for a trained radio repair man not only to determine the nature of the trouble, but particularly to localize it. At the present time in order to locate the trouble it is necessary for him to make repeated substitutions, of condensers for example, and to attempt to find the trouble by the necessarily long drawn out trial and error method. Among other things the radio repair man has to make tests for the continuity of the circuit generally; for an open RF coil in case the circuit lacks continuity; for a short circuited tuning condenser; for an open by-pass condenser and for oscillation which may occur at various points in the set. It is particularly hard for the repair man at present, to locate the cause of trouble where there is an undesirable oscillation in the set, or to determine which of the several by-pass condensers in the set is open and thus causing the disturbance. An open condenser may give rise to oscillation or distortion in the set or it may cause complete deadness of the circuit. Not only are the spaces within the common types of sets extremely small making it difficult and often impossible for the operator to reach the source of the trouble even after he has been able to locate it, but this difficulty is made greater due to the fact that as far as possible every part of the set is shielded, thus adding to the difficulty of getting at the wiring of the circuit. The amount of time that is consumed in the effort to locate the source of the trouble and in the manual labor of taking apart portions of the set in order to get at the cause of the trouble and in re-assembling this portion after the repair work has been done requires far greater time than the actual repair work itself. For these reasons repair work on radio sets is a comparatively slow and expensive procedure.

It is the object of this invention to overcome these difficulties by providing a testing device by the use of which all the various parts of the circuit including the tubes, the RF coils, the tuning condensers, by-pass condensers, and the circuit as a whole may be speedily and accurately tested.

It is a further object of the invention to provide a device which can be introduced into spaces which are far too small to admit the repair man's hand and thus to facilitate the work of testing.

A still further object of the invention is to provide a testing device having the advantages indicated above which at the same time is readily available for use as a tool or as an extension light by which unlighted and shadowed portions of the circuit may be examined.

Other objects of the invention will appear from the following description, read in connection with the accompanying illustrations, but it is to be understood that the invention is not limited thereby, but only by the appended claims.

Referring now to the drawing,

Fig. 1 is a plan view of my device partly in section.

Fig. 2 is a detail view of one end of the casing of my device.

Fig. 3 is a detail view of the contact member or probe insertable in the end of the casing shown in Fig. 2.

Fig. 4 is a schematic view of a tube circuit of a radio receiving set illustrating the manner in which my device is used in testing.

Fig. 5 is a schematic view of a portion of the circuit of a radio receiving set including several by-pass condensers and showing the manner in which my device is used to determine which of said condensers is open.

Fig. 6 is a schematic representation of the circuit of my device when a lamp is used.

Fig. 7 is a schematic representation of the circuit of my device when the lamp is not included.

In the drawing the numeral 10 relates generally to an elongated pencil-like casing formed of any suitable non-conducting material. As illustrated in Fig. 1 I have shown one portion of the casing B of somewhat greater thickness or diameter than the portion A. The portion A is made comparatively long and slender in order that it may be inserted in small spaces within the frame of a radio receiving set and at its front end there is provided an aperture or socket 11 which is adapted to receive and hold tightly seated the probe or fingerlike extension 12. The probe 12 is made of electrically conductive material and for this reason is preferably made of hard metal. The probe 12 is somewhat tapered or pointed at one end 12a in order that it may be placed in contact with the wiring of the circuit even at points where the working space is exceedingly limited, and has at its other end the screw driver 12b.

The portion B of the casing 10 is somewhat enlarged in order to make room for the condenser 13 and the connections to be described which are contained herein.

In the rear end of the casing 10 there is provided a socket 14 for an electric lamp. The socket 14 has a plurality of contacts 15 and 16 insulated from one another by means of a non-conducting shield or diaphragm 17. When an electric lamp 18 is inserted in the socket 14 the ends of the filament are adapted to contact with the contacts 15 and 16 as will be readily understood by those skilled in the art.

The socket 11 in which the probe 12 is supported is connected to the contact 15 of the lamp socket 14 by means of the conductor 20 and interconnecting the conductor 20 and the contact 16 of the lamp socket 14 is a conductor 21 forming a by-pass in which is connected the condenser 13. This condenser may be formed in any well-known manner and as illustrated comprises a number of laminations of copper somewhat spaced from one another by sheets of mica. Connected to the contact 16 of the lamp socket 14 is a lead 22 having at its free end the clip 23 which forms a ready attachment for connecting my device either to a grounded battery or directly to ground according to the purpose for which the device is being used.

It will be readily apparent that when the electric light 18 is inserted in the socket 14 the path of an electric current through to my device will be from the probe 12 through the conductor 20, lamp socket contact 15 through the filament of the lamp and through the lead 22 to the battery 24 and to ground as illustrated at 25 in Fig. 6. If, however, the lamp 18 is removed from the socket 14 the current through my device will be from the probe 12 through the conductor 20, the condenser 13, the conductor 21 to the lamp socket contact 16 and through the lead 22 to ground as illustrated in Fig. 7. The battery 24 is included in the circuit illustrated in Fig. 6 because the lamp 18 is included in that circuit. The current if desired may of course be taken from the source which supplies the set.

Generally speaking the lamp 18 is used in testing for the continuity of the circuit, for an open RF coil and for a short circuited tuning condenser, whereas the lamp is not used and the current is directed through the by-pass condenser 13 in testing for open by-pass condensers within the set or for oscillation generally.

The application of my device in making the tests referred to above is shown respectively in Figs. 4 and 5. In Fig. 4 the lamp is shown inserted in its socket and the point of the probe 12 is shown in contact with a portion of the wiring leading to the grid of one of the tubes. In case of an open RF coil there would be no current flowing through the circuit with the result that the lamp 18 will not light. If on the other hand the continuity of the circuit is perfect the lamp will be lighted to half brilliancy. If one of the tuning condensers is short-circuited an increased current will flow through my device and will be indicated by the lamp being lighted to full brilliancy. I have not mentioned the possibility of an open tuning condenser since this will rarely happen in practice and could be readily seen by the operator.

In using my device without the lamp oscillation may be localized because it will stop when the test probe bridges the broken portion of the circuit. In Fig. 5 I have shown three points which may be touched with the end of the probe in order to test each of the three by-pass condensers illustrated. The condenser within my device is substituted during the period of the test, for the defective condenser of the set and this condenser is identified due to the fact that as soon as the contact is made with the point of the probe the deadness, oscillation, or distortion of the set is overcome.

It will be readily seen that besides simplifying and facilitating the work of the repairman in making tests for trouble my device may be readily used as an insulated screw driver for removing or replacing screws within the frame of the receiving set or by attaching the clip 23 to a battery the device may be reversed and used as an extension light by which portions of the device which are too small to permit any ordinary light to be inserted therein, may be examined.

Obviously my device described herein may be used to advantage in connection with any electric circuit, for instance, in testing the ignition circuit of automobiles. When used in this connection, my device is able to save the operator a great deal of time in locating the source of the trouble or the portion of the circuit in which the broken connection exists.

What I claim is:

1. A device for testing electric circuits, comprising a combination of a pencil-like case, a condenser and a lamp supported in said case and connected in parallel between a probe or contact member and a flexible conductor.

2. A device for testing electric circuits, comprising an elongated contact member, a connection to ground, a lamp adapted to be illuminated by the passage of an electric current therethrough, and a condenser connected in parallel with said lamp between said elongated contact member and connection to ground and a battery intermediate the connection to ground.

ALBERT C. W. SAUNDERS.